(12) United States Patent
Meineke et al.

(10) Patent No.: US 7,299,742 B2
(45) Date of Patent: Nov. 27, 2007

(54) APPARATUS FOR PREPARING HOT BEVERAGES WITH A BOILER AND AN ASSEMBLY FOR INHIBITING SCALE

(75) Inventors: Helmut Meineke, Eigeltingen (DE); Peter Keller, Mels (CH)

(73) Assignee: SAECO IPR Limited (IE)

( * ) Notice: Subject to any disclaimer, the term of this patent is extended or adjusted under 35 U.S.C. 154(b) by 553 days.

(21) Appl. No.: 10/444,348

(22) Filed: May 23, 2003

(65) Prior Publication Data

US 2003/0221564 A1    Dec. 4, 2003

(30) Foreign Application Priority Data

May 29, 2002   (DE) ................................ 102 23 903

(51) Int. Cl.
    *A47J 31/00*    (2006.01)
(52) U.S. Cl. ............................ 99/281; 99/283; 99/288; 99/307
(58) Field of Classification Search ........ 099/279–281, 099/283, 286–288, 284, 290, 291, 295, 300–302 R, 099/304–307, 316, 495, 516, 468, 331–333; 426/433, 519, 425, 431, 429, 430
See application file for complete search history.

(56) References Cited

U.S. PATENT DOCUMENTS

| 2,858,762 | A | * | 11/1958 | Wade | 99/287 |
| 3,092,011 | A | * | 6/1963 | Gee Jr. | 99/287 |
| 3,666,558 | A | * | 5/1972 | Pryor et al. | 134/1 |
| 4,226,175 | A | * | 10/1980 | Sandor | 99/286 |
| 4,644,855 | A | * | 2/1987 | Woolman et al. | 99/280 |
| 4,662,271 | A | * | 5/1987 | Woltermann | 99/299 |
| 4,713,522 | A | * | 12/1987 | Kimura | 219/202 |
| 4,808,306 | A | * | 2/1989 | Mitchell et al. | 210/222 |
| 4,865,747 | A | * | 9/1989 | Larson et al. | 210/695 |
| 4,865,748 | A | * | 9/1989 | Morse | 210/739 |
| 4,872,401 | A | * | 10/1989 | Lee | 99/275 |
| 4,889,041 | A | * | 12/1989 | Mahlich et al. | 99/285 |
| 5,113,751 | A | * | 5/1992 | Holcomb et al. | 99/286 |
| 5,973,996 | A | * | 10/1999 | Zhevelev et al. | 367/99 |
| 5,999,167 | A | * | 12/1999 | Marsh et al. | 345/158 |

FOREIGN PATENT DOCUMENTS

| DE | 29 19 110 A |   | 11/1980 |
| DE | 2919110 |   | 11/1980 |
| DE | 2919110 A | * | 11/1980 |
| FR | 2 586 322 A |   | 2/1987 |
| GB | 2 227 254 A |   | 7/1990 |

* cited by examiner

Primary Examiner—Timothy F. Simone
(74) Attorney, Agent, or Firm—Maginot, Moore & Beck

(57) ABSTRACT

An apparatus for preparing hot beverages includes a boiler and a device for inhibiting scale. That device comprises at least one ultrasound transmitter located at the boiler, inside the boiler or in the region of the boiler. The ultrasound transmitter is operatively coupled to the boiler and excites it to oscillate with its natural frequency. In a preferred embodiment, an ultrasound receiver and an amplifier is provided whose input is connected to the ultrasound receiver and whose output is connected to the ultrasound transmitter. The advantage of the invention is that the boiler always oscillates with its natural frequency, so that the sound energy is optimally used and can be kept lower than it would be for the same effect without resonance.

15 Claims, 1 Drawing Sheet

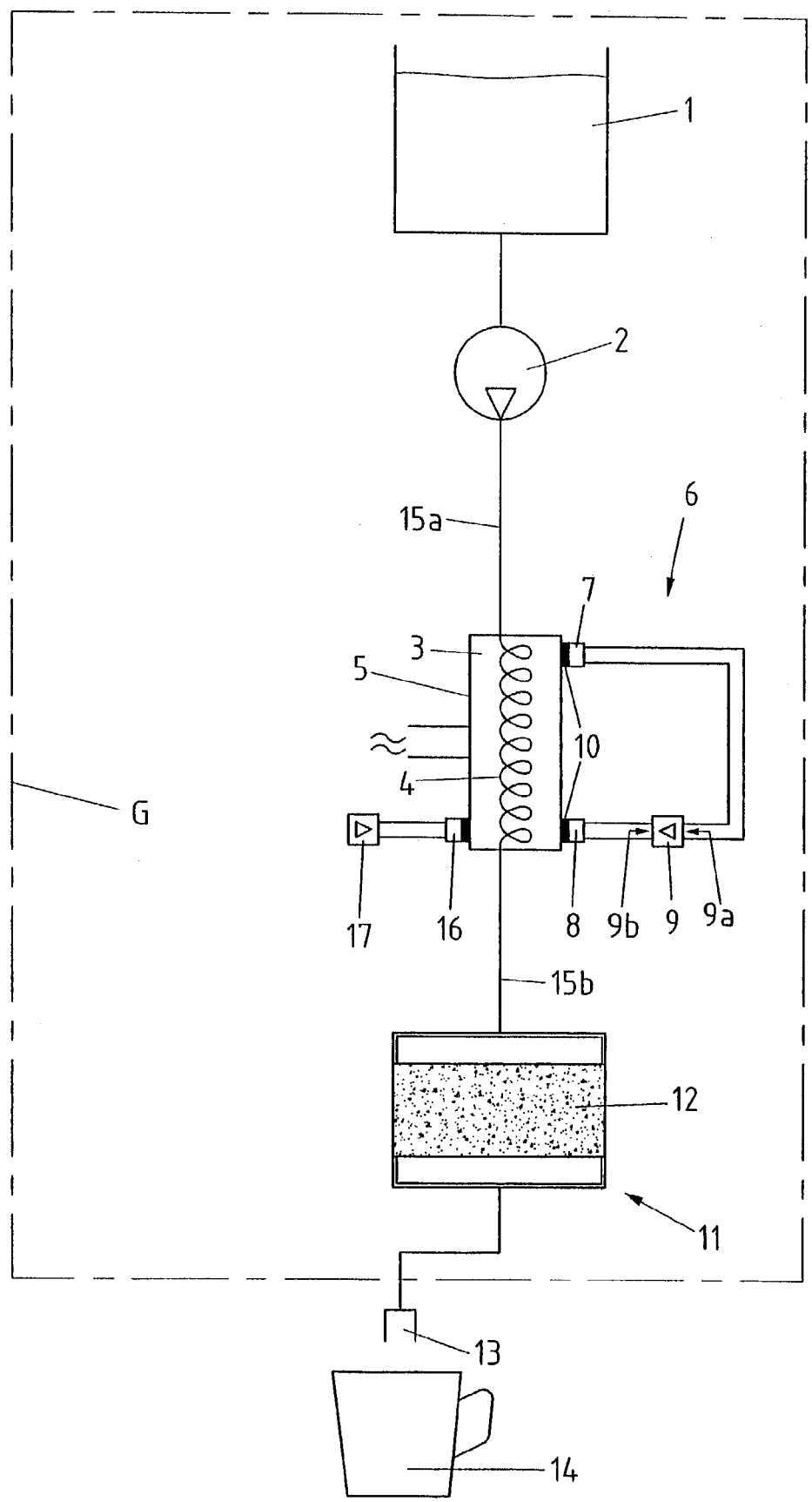

APPARATUS FOR PREPARING HOT BEVERAGES WITH A BOILER AND AN ASSEMBLY FOR INHIBITING SCALE

BACKGROUND OF THE INVENTION

The present invention refers to an apparatus for preparing hot beverages with a boiler and an assembly for inhibiting scale.

As an example for such apparatuses for preparing hot beverages can be named coffee machines, particularly espresso machines. Such machines are in widespread use in the commercial field, e.g. in restaurants, canteens, offices etc. But basically similar machines are used in households more and more often.

PRIOR ART

The German patent document DE 2919110 A1 discloses a coffee machine having a boiler, which is provided with a device for inhibiting scale. This device comprises an ultrasound transmitter creating ultrasound oscillations, located at the boiler or in the boiler. Due to the fact that the shape and materials of a boiler is not favorable for ultrasound treatment, the desired effect of the ultrasound is not optimal. If the sound energy is too low, scale cannot be avoided. However, if the sound energy is increased to such a degree that scale is reliably avoided at all locations in the boiler, many materials of the machine are subjected to an unnecessary stress. The result is that premature fatiguing of some materials can occur; moreover, a more or less uncomfortable sound emission can be noticed. If several machines are used in the same room, sound interferences can occur, resulting in audible, very disturbing sound waves.

OBJECTS OF THE INVENTION

It is an object of the present invention to provide an apparatus for preparing hot beverages with a boiler and an assembly for inhibiting scale in which a sufficient inhibiting of scale is reached with a sound energy as low as possible.

SUMMARY OF THE INVENTION

In order to reach this and other objects, the invention provides an apparatus for preparing hot beverages, particularly a coffee machine, comprising a fresh water supply, a boiler for heating fresh water, and a brewing chamber receiving the beverage powder. Further provided is a water pump for feeding fresh water to the boiler and from the boiler to the brewing chamber having a beverage outlet.

An ultrasound transmitter assembly includes an ultrasound transmitter operatively coupled to the boiler and control means for transmitting ultrasound oscillations to the boiler having a frequency corresponding to the natural frequency of the boiler.

A prerequisite for an optimal effect at a sound energy as low as possible is that a very good adaptation of the sound to the parts of the machine subjected to scale is ensured. An optimal effect can be reached by the fact that the boiler, more precisely the structure consisting of the mechanical parts of the boiler and the elements connected thereto (e.g. ultrasound transmitter, ultrasound receiver etc.) is excited by the sound energy to oscillate with its natural frequency. If this structure is operated at its natural frequency, the transmitted acoustical as well as the consumed electrical energies both are maximal.

In a preferred embodiment, the ultrasound transmitter assembly further comprises an ultrasound receiver operatively coupled to the boiler as well as an amplifier, whereby the input of the amplifier is connected to the ultrasound receiver and the output of the amplifier is connected to the ultrasound transmitter. By receiving the transmitted sound waves and the amplified re-transmission a feedback occurs by means of which it can be ensured that the boiler is excited in such a way that it oscillates with its natural frequency. Thereby, the sound energy is maximally utilized and can be kept lower as it would be necessary for the same effect without resonance.

In a still further embodiment, a heat insulating, sound conducting material is inserted between the ultrasound receiver and the boiler and/or between the ultrasound transmitter and the boiler. Thereby, the thermal stress of the ultrasound transmitter and the ultrasound receiver is reduced, with the result, that usually cheaper components having a lower safe operating temperature can be used. Particularly useful for this heat insulating, sound conducting material is glass or ceramic material.

If the ultrasound receiver is located on the ultrasound transmitter, only one component has to be fixed to the boiler and only one location of transmission of sound is required.

Finally, in a still further embodiment, the ultrasound transmitter assembly comprises several ultrasound transmitters, located at different places of the boiler and, if appropriate, on at least one of the fresh water pipe and hot water pipes.

BRIEF DESCRIPTION OF THE DRAWING

In the following, an embodiment of the apparatus according to the invention will be further described, with reference to the accompanying drawing, in which the only drawing FIGURE shows a strictly schematical view of a coffee machine for preparing espresso coffee.

DETAILED DESCRIPTION OF A PREFERRED EMBODIMENT

The coffee machine shown in the drawing essentially comprises a fresh water tank 1, a feed pump 2 for feeding fresh water to a boiler 3, a brewing chamber, generally designated with reference numeral 11 and containing compressed coffee powder 12 and a schematically outlined housing G containing the afore mentioned parts and elements. Moreover, generally designated with reference numeral 6, an assembly for inhibiting boiler scale is provided in the housing G, as will be further explained herein after. Finally, the drawing shows a beverage outlet 13 and coffee cup 14 placed there below.

As every person skilled in the art knows, fresh water contained in the water tank 1 is fed by the water pump 2 through the pipe 15a into the boiler 3, designed as a flow-type or instantaneous water heater. The heated water flows through a pipe 15b into the brewing chamber 11 in which it extracts the compressed coffee powder 12 contained therein. The final coffee beverage flows then through the beverage outlet 13 into the coffee cup 14.

The fundamental principle of operation of an assembly for inhibiting boiler scale is that ultrasound oscillations created by an ultrasound transmitter coupled to the water heating system prevent scale particles precipitating from the water upon heating thereof to deposit on the parts and elements of the water heater, particularly on the heating element 4 or on the walls 5 of the boiler 3. According to the present invention, this is accomplished as follows:

An ultrasound transmitter 8 is connected to the boiler 3 at a first location, e.g. in the region of its lower end, and a ultrasound receiver 7 is connected to the boiler 3 at a second location remote from the ultrasound transmitter 8, e.g. in the region of its upper end. The ultrasound receiver 7 is connected to the ultrasound transmitter 8 via an amplifier 9. Thus, the ultrasound oscillations transmitted to the entire system comprising the housing of the boiler 3, the heating element 4 and the pipes 15a, 15b are picked-up by the ultrasound receiver 8, amplified by the amplifier 9 and, without altering the phase, fed back to the ultrasound transmitter 7.

Due to the fact that the oscillations created by the ultrasound transmitter 8 are received by the ultrasound receiver 7, amplified by the amplifier 9 and fed to the ultrasound transmitter 8 again, a feedback loop is created that oscillates by itself. Thereby, the frequency of oscillation is determined by the entire system comprising the ultrasound transmitter 8, the ultrasound receiver 7, the housing of the boiler 3, the heating element 4 and the pipes 15a, 15b. Almost immediately, the frequency of oscillation will self-adjust to a frequency in which the damping within the entire system is lowest.

Since the resonance frequency of the system comprising the housing of the boiler 3, the heating element 4 and the pipes 15a, 15b are known and can be measured, respectively, the frequency of oscillation is determined by the resonance frequency of the ultrasound transmitter 8 and of the ultrasound receiver 7. Thus, for an optimal function, the resonance frequency of the ultrasound transmitter 8 and of the ultrasound receiver 7 should be equal. It has proven advantageous to use an ultrasound transmitter 8 and an ultrasound receiver 7 each having a resonance frequency in the range of 40-150 kHz, preferably of about 120 kHz.

The amplifier 9 should be a selective amplifier having a high gain at the resonance frequency of the ultrasound transmitter 8 or at least an amplifier having a high gain at this frequency.

The least damping for the entire ultrasound system is given if the entity consisting of ultrasound transmitter 8, boiler 3, ultrasound receiver 7 and amplifier 9 is in coincidence with the ultrasound frequency. Thus, the parts oscillating under the influence of the ultrasound show the greatest amplitude for a given input power. If these conditions change, for example due to thermal expansion of the boiler 3 upon heating, the entire system automatically adjusts to the new, optimal frequency. Any changes, e.g. by exchanging water pipes 15a, 15b having slightly different mass, dimensions or layout, do not have any influence and are automatically compensated as far as the optimal ultrasound frequency is concerned. To sum up, as long as the ultrasound system is in operation, the scale particles contained in the water cannot deposit as scale.

The influence of the ultrasound is limited as far as its range or coverage is concerned. Within the scope of the present invention, a remedy for this fact could consist in providing several ultrasound transmitters, be it on the boiler 3, be it on different elements like one or more on the boiler 3, one on the feed pipe 15a and one on the hot water pipe 15b. The position of the ultrasound receiver 7 determines the part to which the ultrasound is optimally adjusted. Thus, particularly advantageous is to provide the ultrasound transmitter 8 and the ultrasound receiver 7 at the boiler 3 in the region of the inlet of the fresh water pipe 15a and, if appropriate, one or more ultrasound transmitters at other particularly endangered locations. If the ultrasound receiver 7 is attached directly to the ultrasound transmitter 8, this unit can be placed at a location that is particularly endangered by scale.

If the ultrasound transmitter 8 or the ultrasound receiver 7 is made of piezo ceramic material, the environmental temperature where they can be used is limited due to the Curie temperature of the material. In this case, preferably a heat insulating but sound conducting material 10 should be used, inserted between the housing 5 of the boiler 3 and the ultrasound receiver 7 and/or the ultrasound transmitter 8. Thus, the temperature at the surface of the ultrasound receiver 7 and/or the ultrasound transmitter 8 is lower than the temperature at the surface of the boiler 3. In this manner, the thermal stress of the ultrasound receiver 7 and/or the ultrasound transmitter 8 is lowered. The safety regarding over-heating is increased. If the boiler 3 is provided with a temperature control that guarantees a reliable temperature limiting, and by inserting a heat insulating and sound conducting material 10 between ultrasound receiver 7 and boiler 3 as well as between ultrasound transmitter 8 and boiler 3, an ultrasound receiver 7 and an ultrasound transmitter 8 having a lower maximal operating temperature and, therewith, in most cases a cheaper ultrasound receiver 7 and ultrasound transmitter 8 can be used. Preferably, the heat insulating and sound transmitting material 10 can be a glass or ceramic plate. These plates can be manufactured at low costs and are easy to mount.

Of course, it is also possible, in place of the control loop described before, to use an ultrasound transmitter, which is operated at a fixed frequency. Important is first and foremost that that object on which scale is to be inhibited is oscillating with its inherent frequency under the influence of the ultrasound transmitter 8. Be this realized by a control loop or by another means, e.g. by a preliminary measurement or calculation of the inherent oscillation frequency, is of subordinate importance.

A further advantage of the device for inhibiting scale according to the invention may be seen in the fact that it has a very high efficiency. For example, an input power of between 100 mW to 250 mW of high frequency power is sufficient for reliable operation. Moreover, it is ensured that no premature or substantial fatigue occurs at the boiler and that no substantial audible noise radiation can be detected.

Instead of using separate ultrasound receivers and ultrasound transmitters, an embodiment could be realized in which an ultrasound transmitter 16 is simultaneously used as an ultrasound receiver. This could be realized in that the ultrasound transmitter 16 is intermittently operated as ultrasound receiver, transforming the received signals into electrical signals that are processed in a suitable processing unit 17.

Alternatively, the inherent frequency of the boiler 3 can be detected indirectly, for example by adjusting and controlling, respectively, the operating frequency until the power consumption of the ultrasound transmitter 16 has reached a maximum. In this case, the assembly consisting of the ultrasound transmitter 16 and boiler 3 is operated with this frequency. If the inherent frequency of this assembly changes, for example by exterior influences like thermal expansion of the boiler 3, the power consumption of the ultrasound transmitter 16 changes. This can easily be measured by a shunt resistor (not shown) in the power supply line of the ultrasound transmitter 16. In this case, the processing unit 17 could include a circuitry that monitors the current flowing through the shunt resistor and changes the operating frequency of the ultrasound transmitter 16 until the assembly is operating with its optimal efficiency again.

What is claimed is:

1. Apparatus for preparing hot beverages, particularly a coffee machine, comprising:
   a fresh water supply;
   a boiler for heating said fresh water;
   a brewing chamber adapted to receive beverage powder;
   a water pump for feeding fresh water through a fresh water pipe to said boiler and from said boiler through a hot water pipe to said brewing chamber;
   a beverage outlet; and
   an ultrasound transmitter assembly including an ultrasound transmitter operatively coupled to said boiler, said ultrasound transmitter assembly including control means for transmitting ultrasound oscillations to said boiler having a frequency corresponding to the natural frequency of said boiler.

2. Apparatus according to claim 1 in which said ultrasound transmitter assembly further includes means for measuring the frequency of the oscillating portions of said boiler.

3. Apparatus according to claim 1 in which said ultrasound transmitter is adapted to be operated as an ultrasound receiver.

4. Apparatus according to claim 1 in which said ultrasound transmitter assembly further includes means for measuring the power consumption of said ultrasound transmitter.

5. Apparatus according to claim 1 in which said ultrasound transmitter assembly further includes means for measuring the power consumption of said ultrasound transmitter and means for controlling the operating frequency of said ultrasound transmitter in response to a detected change of power consumption.

6. Apparatus according to claim 1 in which said ultrasound transmitter assembly further comprises an ultrasound receiver operatively coupled to said boiler as well as an amplifier, the input of said amplifier being connected to said ultrasound receiver and the output of said amplifier being connected to said ultrasound transmitter.

7. Apparatus according to claim 6 in which a heat insulating, sound conducting material is inserted between said ultrasound receiver and said boiler.

8. Apparatus according to claim 6 in which a heat insulating, sound conducting material is inserted between said ultrasound transmitter and said boiler.

9. Apparatus according to claim 7 in which said heat insulating, sound conducting material consists of a glass or ceramic plate.

10. Apparatus according to claim 6 in which said ultrasound receiver is located on said ultrasound transmitter.

11. Apparatus according to claim 1 in which said ultrasound transmitter assembly comprises several ultrasound transmitters, located at different places of the boiler.

12. Apparatus according to claim 1 in which said ultrasound transmitter assembly comprises several ultrasound transmitters, located at different places of the boiler and on at least one of said fresh water pipe and said hot water pipe.

13. Apparatus according to claim 1 in which said ultrasound transmitter is operated at a frequency of between 40 and 150 kHz, preferably 120 kHz.

14. Apparatus according to claim 1 in which said ultrasound transmitter is operated with an input power of between 100 and 250 mW.

15. Apparatus according to claim 8 in which said heat insulating, sound conducting material consists of a glass or ceramic plate.

\* \* \* \* \*